United States Patent [19]

Tung et al.

[11] 4,174,673
[45] Nov. 20, 1979

[54] LOW PRESSURE WARNING TIRE AIR VALVE CAP

[76] Inventors: Wei-Ling Tung, No. 7, Alley 1, Lane 269, Chung-Shiao East Rd., Section 6; Steven Kwan, No. 43, Alley 148, Lane 30, Yung-Chi Rd., both of Taipei, Taiwan

[21] Appl. No.: 893,852

[22] Filed: Apr. 6, 1978

[51] Int. Cl.² ............................................. B60C 23/04
[52] U.S. Cl. .................................. 116/34 R; 116/70; 116/266
[58] Field of Search ..................... 73/146.8; 116/34 R, 116/34 A, 34 B, 114 PV

[56] References Cited

U.S. PATENT DOCUMENTS

| | | | |
|---|---|---|---|
| 1,455,146 | 5/1923 | Nelson | 116/34 R |
| 1,671,852 | 5/1928 | Caldwell | 116/34 R |
| 4,024,829 | 5/1977 | Su | 116/34 R |

*Primary Examiner*—Donald O. Woodiel
*Attorney, Agent, or Firm*—Ladas, Parry, Von Gehr, Goldsmith & Deschamps

[57] ABSTRACT

A low pressure warning cap for a pneumatic tire air valve including a generally cylindrical body having first and second ends, a cylinder adjacent the first end, a threaded connector for attachment to a conventional air valve stem of a pneumatic tire at the second end and an acting chamber connecting with and disposed intermediate the cylinder and the threaded connector, a piston disposed in the cylinder and resiliently biased toward the acting chamber, the cylinder having an opening at the first end, a deformable diaphragm disposed across the acting chamber between the threaded connector and the enlarged end, a perforated diaphragm disposed across the cylinder adjacent the opening, an elastic sack enveloping in air tight manner the first end including the opening, and a protuberance in the threaded connector to cooperate with the valve to open the valve upon attachment of the cap to valve, whereby, at a desired tire pressure, the deformable diaphragm is deformed by air from at the desired pressure to move the piston against the bias into air-tight engagement with the body to prevent passage of the air into the cylinder and, upon the occurrence thereafter of an undesirably low tire pressure, the piston is biased against this undesirably low air pressure to allow the air into the cylinder past the piston to pass by way of the perforated diaphragm and opening to inflate and rupture the sack to provide an audible indicaton of the undesirably low tire pressure.

3 Claims, 6 Drawing Figures

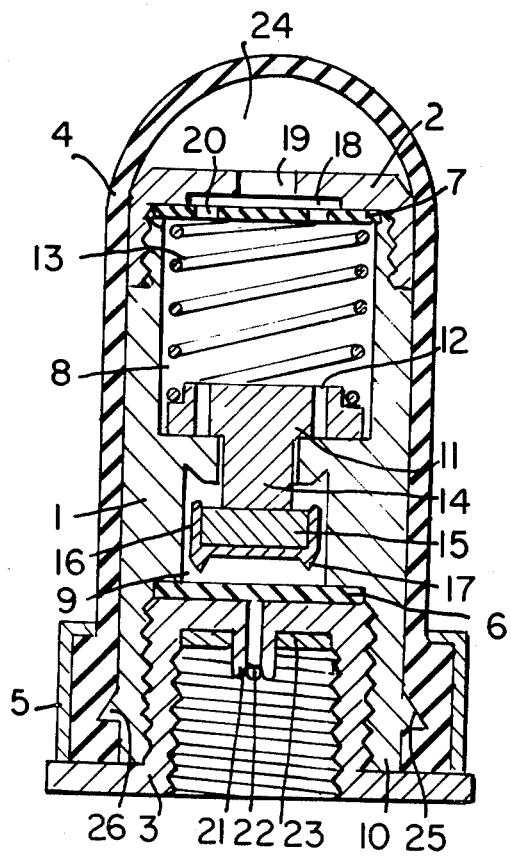

LOW PRESSURE WARNING TIRE AIR VALVE CAP

The present invention relates to an air valve cap device for pneumatic tires, which cap is able to produce an audible signal alarm when the tire deflates a certain amount of tire air.

Various similar signal devices have been proposed to give the vehicle driver a warning that tire pressure has reduced below a predetermined level. However, the common disadvantages are that they require complicated structure and high cost to manufacture.

Therefore, it is the main object of the present invention to provide an air valve cap device for pneumatic tires, having effective and reliable performance for giving an audible signal alarm before the vehicle tire will be possibly damaged during driving.

It is another object to provide the above-mentioned device with a simple structure and easy installation.

According to the present invention there is provided a low pressure warning cap for a pneumatic tire air valve comprising a generally cylindrical body having first and second ends, a cylinder adjacent the first end, a threaded connector for attachment to a conventional air valve stem of a pneumatic tire at the second end and an acting chamber connecting with and disposed intermediate the cylinder and the threaded connector, a piston disposed in the cylinder and resiliently biased toward the acting chamber, the cylinder having an opening at the first end, a deformable diaphragm disposed across the acting chamber between the threaded connector and the enlarged end, a perforated diaphragm disposed across the cylinder adjacent the opening, an elastic sack enveloping in air tight manner the first end including the opening, and a protuberance in the threaded connector to cooperate with the valve to open the valve upon attachment of the cap to valve, whereby, at a desired tire pressure, the deformable diaphragm is deformed by air from at the desired pressure to move the piston against the bias into air-tight engagement with the body to prevent passage of the air into the cylinder and, upon the occurrence thereafter of an undesirably low tire pressure, the piston is biased against this undesirably low air pressure to allow the air into the cylinder past the piston to pass by way of the perforated diaphragm and opening to inflate and rupture the sack to provide an audible indication of the undesirably low tire pressure.

According to a preferred aspect of the invention there is provided a low pressure warning cap for a pneumatic tire air valve comprising a generally cylindrical body having first and second ends, a cylinder adjacent the first end, a threaded connector for attachment to a conventional air valve stem of a pneumatic tire at the second end and an acting chamber connecting with and disposed intermediate the cylinder and the threaded connector, a piston assembly including a piston disposed in the cylinder and resiliently biased toward the acting chamber, an enlarged end disposed in the acting chamber and a piston rod rigidly interconnecting the piston and the enlarged end, the cylinder having an opening at the first end, a deformable diaphragm disposed across the acting chamber between the threaded connector and the enlarged end, a perforated diaphragm disposed across the cylinder adjacent the opening, an elastic sack enveloping in air tight manner the first end including the opening, and a protuberance in the threaded connector to cooperate with the valve to open the valve upon attachment of the cap to valve, whereby, at a desired tire pressure, the deformable diaphragm is deformed by air from at the desired pressure to move the enlarged end and piston against the bias to bring the enlarged end into air-tight engagement with the body to prevent passage of the air into the cylinder and, upon the occurrence thereafter of an undesirably low tire pressure, the enlarged end and piston are biased against this undesirably low air pressure to allow the air into the cylinder past the piston to pass by way of the perforated diaphragm and opening to inflate and rupture the sack to provide an audible indication of the undesirably low tire pressure.

The invention will now be described, by way of example, with reference to the accompanying drawings, in which.

Figure 1:
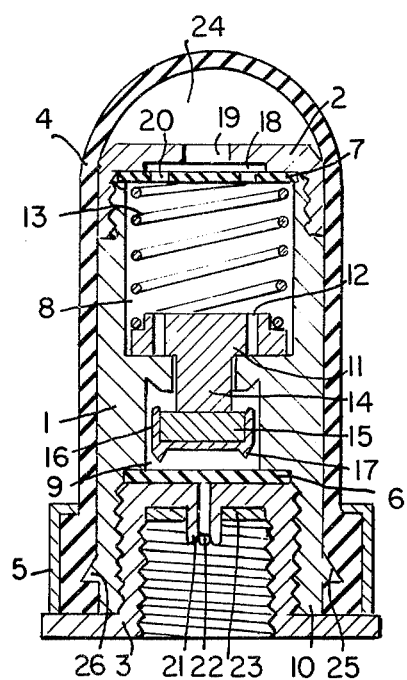
FIG. 1 is an elevational view in section of the air valve cap device for a pneumatic tire according to the present invention.

Referring now to FIG. 1 of the drawings, the device of the present invention generally has a configuration of a bullet shape and is mainly composed of a body member 1, an end cap 2, a bushing 3, an elastic sack 4, a set ring 5 and two diaphragms 6 and 7.

The body member 1 comprises a cylinder 8, an acting chamber 9 and a skirt portion 10. The cylinder 8 contains a piston 11 with a plurality of perforations 12 and a compressible coil spring 13. The piston rod 14 has an enlarged lower head 15 encased with a rigid layer 16 having a plurality of downwardly extending teeth 17 at its outer periphery. The said head 15 extends downwardly into the acting chamber 9.

The end cap 2 with internal threads has a recessed cavity 18 and an opening 19 at about its center. When said end cap 2 is screwed over the top end of the body member 1, the diaphragm 7 with a plurality of perforations 20 is disposed and tightly secured therebetween.

In a similar manner, when the bushing 3 is screwed inside the skirt portion 10, the acting diaphragm 6 is disposed and tightly secured between the acting chamber 9 and said bushing 3. The bushing 3 has an inner protrusion 21 with an aperture 22 at its center. A sealing washer 23 is inserted around said protrusion 21.

The elastic sack 4, made of rubber for example, envelopes said body member 1 and end cap 2 in such a manner that it is in tight contact along the cylindrical periphery of said body member 1 and forms a space 24 over said end cap 2 for receiving escaping tire air. The sack 4 at its lower end has an inner annular groove 25 for engagement with a corresponding annular flange means 26 provided at the outside surface of said skirt portion 10. After the sack 4 has been mounted over said body member 1, it is further fixed by the set ring 5 for ensuring that it is not stripped off by accident.

Figure 2:
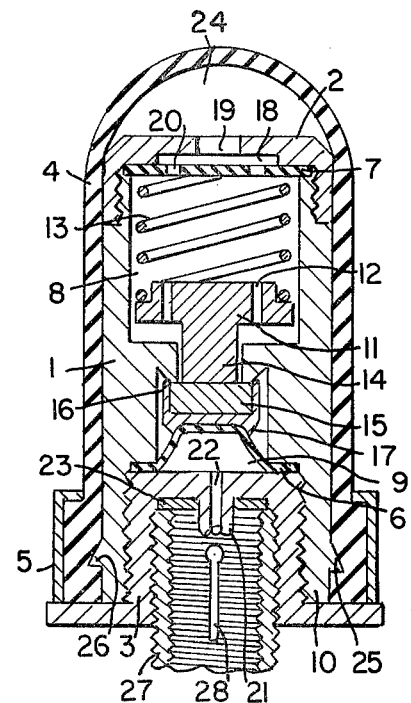
FIG. 2 is an elevational view in section, illustrating that the acting diaphragm is inflated.
Figure 3:
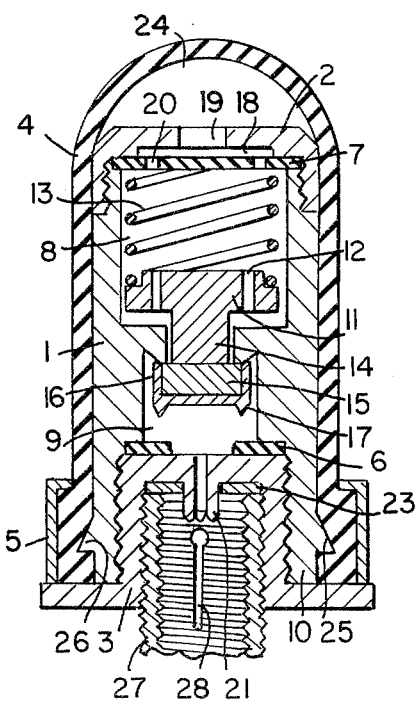
FIG. 3 is an elevational view in section, illustrating that the acting diaphragm is broken.

When the device of the present invention is installed on to the air filling valve 27 of a pneumatic tire, the said inner protrusion 21 of said bushing 3 will press down the valve stem 28. Pressurized tire air will then pass through said aperture 22 to inflate the acting diaphragm into the acting chamber 9, as shown in FIG. 2. The inflated diaphragm 6 pushes the piston 11 upwards against the coil spring 13 until the lower head 15 contacts the end of said acting chamber 9 in air-tight manner. The diaphragm 6 then contacts the teeth 17 and is punctured thereby, as shown in FIG. 3.

Figure 4:
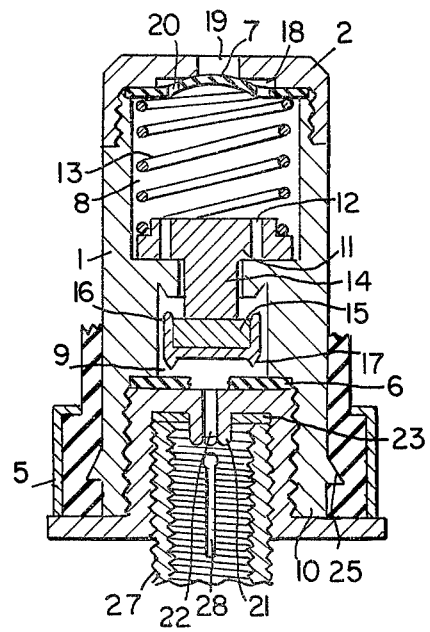
FIG. 4 is an elevational view in section, illustrating that the elastic sack is ruptured.
Figure 5:
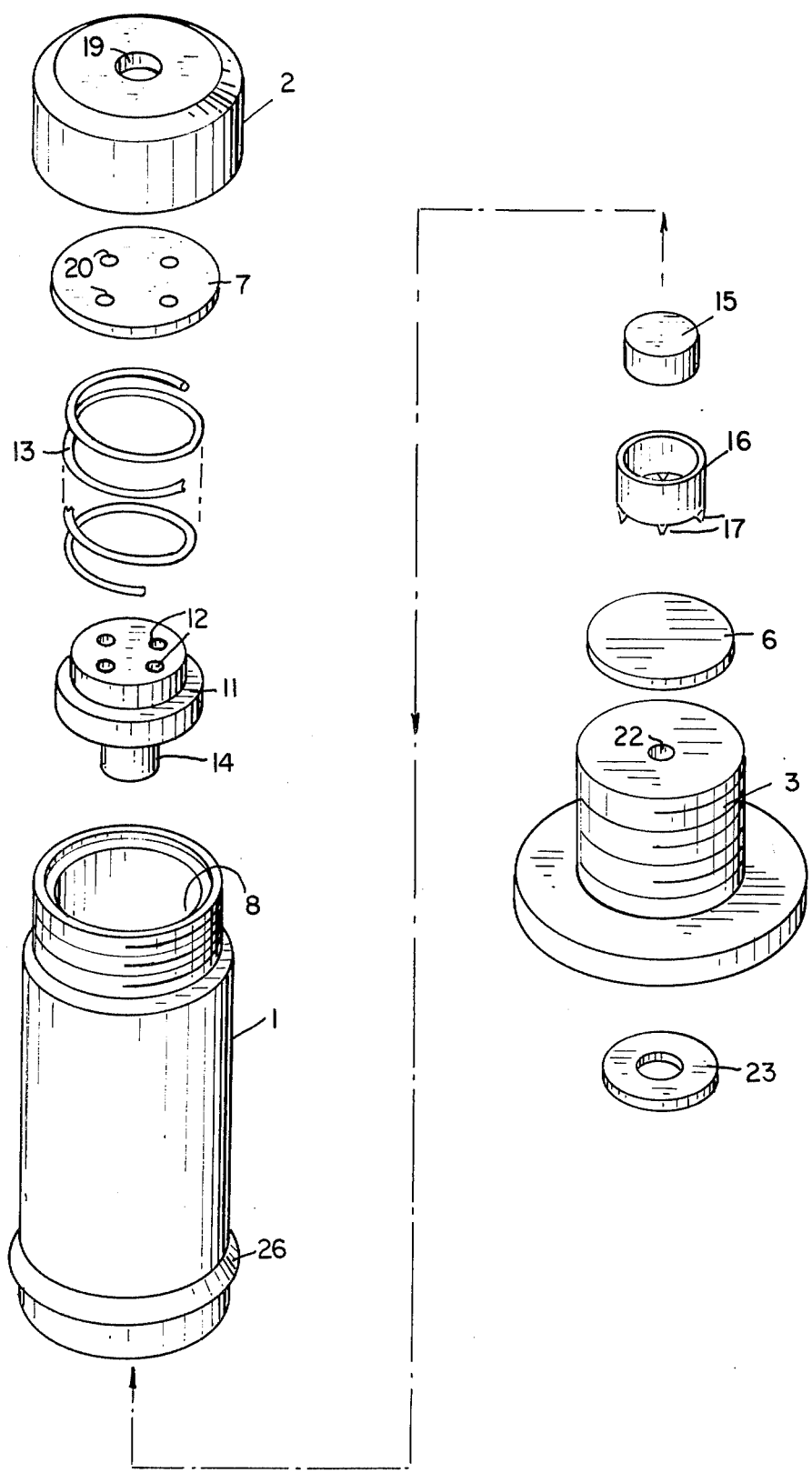
FIG. 5 is an exploded perspective view of the body member.
Figure 6:
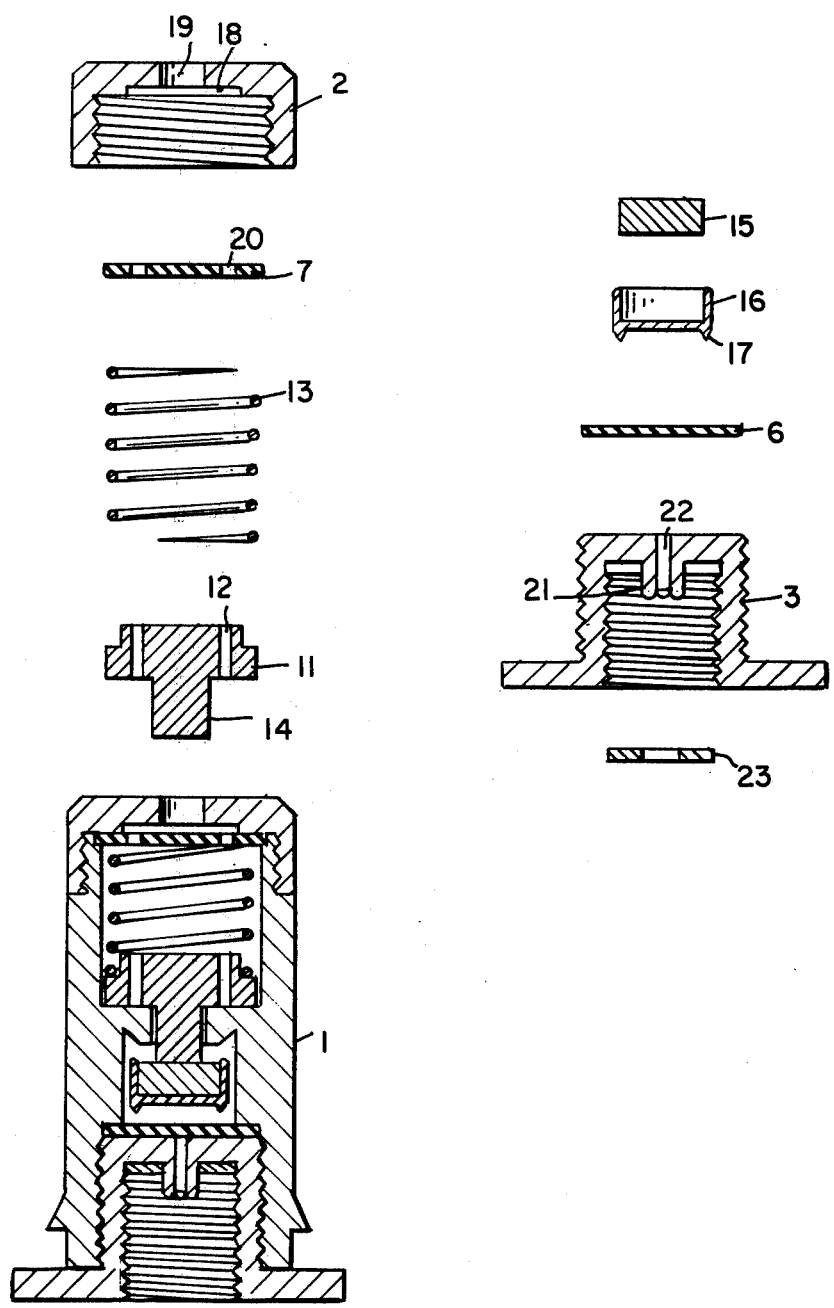
FIG. 6 is an elevational view of the body member represented in an exploded manner and corresponding with the view shown in FIG. 5.

In the event of an undesirably low tire pressure occurring, such as upon piercing of the tire by a nail or the like, the piston 15 will be pushed downwards by the restoration force of the spring 13, as shown in FIG. 4. The lower head 15 then leaves the end of the acting chamber 9, the tire air will pass through the annular space around the piston rod and through perforations 12 into cylinder 8 and to the space 24 (FIG. 1) through perforations 20 and opening 19, to act on the elastic sack 4 to cause same to swell like a balloon. When the air pressure within sack 4 reaches the breaking point of the sack, the sack will burst and emit an explosive sound to give a warning to the vehicle driver to take remedial action.

As soon as the sack 4 bursts, the outgoing air through cylinder 8 is greatly increased, thereby deforming the sealing diaphragm 7 to close the opening 19 to prevent further escape of air from the valve.

We claim:

1. A low pressure warning cap for a pneumatic tire air valve comprising:
   a generally cylindrical body having first and second ends, a cylinder adjacent the first end, a threaded connector for attachment to a conventional air valve stem of a pneumatic tire at the second end and an acting chamber connecting with and disposed intermediate the cylinder and the threaded connector;
   a piston disposed in the cylinder and resiliently biased toward the acting chamber;
   the cylinder having an opening at the first end;
   a deformable diaphragm disposed across the acting chamber between the threaded connector and the piston;
   a perforated diaphragm disposed across the cylinder adjacent the opening;
   an elastic sack enveloping in air tight manner the first end including the opening;
   a protuberance in the threaded connector to cooperate with the valve to open the valve upon attachment of the cap to valve, whereby, at a desired tire pressure, the deformable diaphragm is deformed by air from at the desired pressure to move the piston against the bias into air-tight angagement with the body to prevent passage of the air into the cylinder; and
   the piston having means to rupture the deformable diaphragm when the piston has been moved into air-tight engagement with the body, whereby, upon the occurrence thereafter of an undesirably low tire pressure, the piston is biased against this undesirably low air pressure to allow the air into the cylinder past the piston to pass by way of the perforated diaphragm and opening to inflate and rupture the sack to provide an audible indication of the undesirably low tire pressure.

2. A low pressure warning cap for a pneumatic tire air valve comprising:
   a generally cylindrical body having first and second ends, a cylinder adjacent the first end, a threaded connector for attachment to a conventional air valve stem of a pneumatic tire at the second end and an acting chamber connecting with and disposed intermediate the cylinder and the threaded connector;
   a piston assembly including a piston disposed in the cylinder and resiliently biased toward the acting chamber, an enlarged end disposed in the acting chamber and a piston rod rigidly interconnecting the piston and the enlarged end;
   the cylinder having an opening at the first end;
   a deformable diaphragm disposed across the acting chamber between the threaded connector and the enlarged end;
   a perforated diaphragm disposed across the cylinder adjacent the opening;
   an elastic sack enveloping in air tight manner the first end including the opening;
   a protuberance in the threaded connector to cooperate with the valve to open the valve upon attachment of the cap to valve, whereby, at a desired tire pressure, the deformable diaphragm is deformed by air from at the desired pressure to move the piston assembly against the bias to bring the enlarged end into air-tight engagement with the body to prevent passage of the air into the cylinder; and
   the enlarged and of the piston assembly having means to rupture the deformable diaphragm when the enlarged end has been moved into air-tight engagement with the body, whereby, upon the occurence thereafter of an undesirably low tire pressure, the piston assembly is biased against this undesirably low air pressure to allow the air into the cylinder past the piston to pass by way of the perforated diaphragm and opening to inflate and rupture the sack to provide an audible indication of the undesirably low tire pressure.

3. A cap as claimed in claim 2, wherein the means to rupture the deformable diaphragm is a rigid layer encasing the enlarged end and having a plurality of downwardly extending teeth at the outer periphery thereof to break said deformable diaphragm when the piston assembly has been moved into air-tight engagement with the body.

* * * * *